US011695358B2

United States Patent
Sun et al.

(10) Patent No.: US 11,695,358 B2
(45) Date of Patent: Jul. 4, 2023

(54) SPEED CONTROL METHOD FOR PERMANENT MAGNET SYNCHRONOUS MOTOR CONSIDERING CURRENT SATURATION AND DISTURBANCE SUPPRESSION

(71) Applicant: DALIAN UNIVERSITY OF TECHNOLOGY, Liaoning (CN)

(72) Inventors: Ximing Sun, Liaoning (CN); Jianyi Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 89 days.

(21) Appl. No.: 17/431,326

(22) PCT Filed: Oct. 27, 2020

(86) PCT No.: PCT/CN2020/123794
§ 371 (c)(1),
(2) Date: Aug. 16, 2021

(87) PCT Pub. No.: WO2022/087799
PCT Pub. Date: May 5, 2022

(65) Prior Publication Data
US 2022/0311366 A1   Sep. 29, 2022

(51) Int. Cl.
*H02P 21/00* (2016.01)
*H02P 21/13* (2006.01)
(Continued)

(52) U.S. Cl.
CPC .............. *H02P 21/13* (2013.01); *H02P 21/18* (2016.02); *H02P 21/22* (2016.02)

(58) Field of Classification Search
CPC .......... H02P 21/13; H02P 21/18; H02P 21/22; H02P 2205/07; H02P 2207/05; H02P 23/14; H02P 6/34
See application file for complete search history.

(56) References Cited

U.S. PATENT DOCUMENTS

2011/0266987 A1   11/2011   Markunas et al.

FOREIGN PATENT DOCUMENTS

| CN | 108390597 A | 8/2018 |
| CN | 110190795 A | 8/2019 |

(Continued)

*Primary Examiner* — Karen Masih
(74) *Attorney, Agent, or Firm* — Muncy, Geissler, Olds & Lowe, P.C.

(57) ABSTRACT

A speed control method for a permanent magnet synchronous motor considering current saturation and disturbance suppression aims to effectively ensure that a current of the motor is always within a given range to avoid the problem of control performance reduction caused by the fact that the current gets into a saturation state, ensure the safety of a system, do not need to use unavailable state variables such as motor acceleration and the like, effectively estimate and compensate disturbances including parameters uncertainty and unknown load torque disturbance existing in a permanent magnet synchronous motor system, and rapidly and accurately control a speed of the motor finally. There is no need to configure a plurality of sensors in practical industrial application, so system building costs can be reduced on the one hand, and the stability of the system can be improved on the other hand.

1 Claim, 3 Drawing Sheets

(51) Int. Cl.
    *H02P 21/18*     (2016.01)
    *H02P 21/22*     (2016.01)

(56) References Cited

FOREIGN PATENT DOCUMENTS

| CN | 110429881 A | | 11/2019 |
|---|---|---|---|
| CN | 110492804 A | | 11/2019 |
| CN | 110557067 A | * | 12/2019 |
| CN | 110943657 A | | 3/2020 |
| CN | 111510035 A | | 8/2020 |

* cited by examiner

SPEED CONTROL METHOD FOR PERMANENT MAGNET SYNCHRONOUS MOTOR CONSIDERING CURRENT SATURATION AND DISTURBANCE SUPPRESSION

TECHNICAL FIELD

The present invention belongs to the technical field of permanent magnet synchronous motor control, and more particularly relates to a speed control technology for a permanent magnet synchronous motor capable of effectively avoiding a current saturation phenomenon and accurately overcoming the influence of internal and external disturbances of a system.

BACKGROUND

A permanent magnet synchronous motor has numerous advantages such as high power factor, quick dynamic response, high efficiency, low loss and low temperature rise, and plays an important role in the fields of aerospace, medical device and industrial production, for example, aero-engine actuators, medical robots, and various mechanical devices need permanent magnet synchronous motors as power sources. Recently, the rapid development of industrial modernization has put forward higher requirements for operating efficiency, control precision and other performance of permanent magnet synchronous motors. Therefore, it is crucial to design a high-efficiency and high-precision control method for a permanent magnet synchronous motor. However, a permanent magnet synchronous motor system has the characteristics of complex non-linearity, multiple variable and strong coupling, which brings great challenge to the design of control systems.

At present, the most widely used speed loop control algorithm of a permanent magnet synchronous motor in the industrial field is a PI control scheme, which has the advantages of simple structure and easy adjustment on the one hand but cannot effectively overcome disturbances including parameters uncertainty caused by the fact that the true values of the motor parameters are not corresponding to the nominal values and torque disturbance caused by load sudden change existing in the permanent magnet synchronous motor system on the other hand. In order to make up for the defect that the performance of the PI control strategy decreases sharply in the face of multi-source disturbances, many researchers have begun to design control methods with high anti-disturbance capability and strong robustness, some control schemes with research values have been put forward successively. It should be noted that through the analysis and summarization of the prior art, although the control of the permanent magnet synchronous motor has made some progress, some crucial problems still exist which deserve to be thoroughly analyzed and urgently solved.

1) When designing a permanent magnet synchronous motor controller, most of the existing technologies ignore the problem of current saturation, assume that the current of the motor can reach any given value, and do not fully consider the safety problem of the motor in an unreasonable current operating state. If the problems of current saturation and safety protection are not considered when designing a control method, on the one hand, the current of the permanent magnet synchronous motor cannot be arbitrarily large in practical application, once the calculated current value exceeds the upper limit value or limiting value of the current which can be provided by the motor, the control algorithm may get saturated and then lose adjustment capability, thereby destroying the control effect and even causing instability of the system; on the other hand, the permanent magnet synchronous motor operates in an unreasonable high current state for a long time, which may cause the motor to burn down due to the sharp rise of the temperature of the motor, and then may cause a serious industrial accident.

2) The permanent magnet synchronous motor faces the influence of various disturbances including system parameters uncertainty and outside disturbances, etc. in practical application. Generally speaking, most of the existing methods for dealing with system disturbances adopt sliding mode control strategies, which have strong robustness to overcome the influence of system disturbances in theory. However, sliding mode control requires a high-gain signum function term to suppress disturbances, which also brings the biggest obstacle-chattering problem in industrial application. A chattering phenomenon may affect the control accuracy, increase the energy consumption of the system, and easily stimulate the high-frequency un-modeled dynamics of the system and then cause instability of the system.

3) Some of the existing technologies need to introduce state variables such as motor acceleration signal, etc. which difficult to measure directly when designing the controller, which brings difficulty to the specific realization of the controller. At present, with the high speed development of sensor technologies, some state variables which cannot be directly obtained before can be measured by corresponding sensors. However, such high-precision sensors are expensive, increasing the costs of permanent magnet synchronous motor control systems, and expensive technical solutions are often not advocated in practical industrial application.

In conclusion, in order to effectively ensure that the current of the motor is always within a given range while controlling the high performance speed of the permanent magnet synchronous motor, efficiently suppress system disturbances on the premise of avoiding or weakening chattering caused by sliding mode control, and do not use state variables which are difficult to measure or high in cost, an effective control algorithm is urgently needed to further improve the control performance of a permanent magnet synchronous motor system.

SUMMARY

In view of the defects existing in the speed control method for a permanent magnet synchronous motor in the prior art, the present invention provides a speed control method for a permanent magnet synchronous motor considering current saturation and disturbance suppression, which aims to effectively ensure that a current of the motor is always within a given range, do not need to use unavailable state variables such as motor acceleration and the like, effectively estimate and compensate disturbances including parameters uncertainty and unknown load torque disturbance existing in a permanent magnet synchronous motor system, and rapidly and accurately control a speed of the motor finally.

The technical solution of the present invention is as follows:

A speed control method for a permanent magnet synchronous motor considering current saturation and disturbance suppression, comprising the following steps:

step 1: determining a mathematical model of a speed loop of a permanent magnet synchronous motor:

by taking rotor coordinates d–q axes of the motor as reference coordinates system, on the premise of fully considering system parameters uncertainty and unknown load torque disturbance, building a mathematical model of a speed loop of a permanent magnet synchronous motor:

$$\dot{w} = \left(\frac{K_{to}}{J_o} + \Delta a\right)i_q - \left(\frac{B_o}{J_o} + \Delta b\right)w - \frac{T_L}{J};$$

where w represents a speed of the motor, $i_q$ represents a stator current of q axis, i.e. a permanent magnet synchronous motor speed controller to be designed, $T_L$ represents unknown load torque of the system, $J_o$, $K_{to}$, and $B_o$ respectively represent nominal values of a moment of inertia, a torque constant, and a viscous friction coefficient, J, $K_t$, and B respectively represent true values of the moment of inertia, the torque constant, and the viscous friction coefficient, and $\Delta a = K_t/J - K_{to}/J_o$ and $\Delta b = B/J - B_o/J_o$ represent differences between the true values of the system parameters and the nominal values;

intensively expressing disturbances caused by system parameters uncertainty and unknown load torque disturbance as lumped disturbances:

$$d(t) = -\Delta a i_q + \Delta b w + \frac{T_L}{J},$$

which satisfies the following bounded conditions: $|d(t)| < l_1$, $|\dot{d}(t)| < l_2$ where $l_1$ and $l_2$ represent positive constants;

further expressing the mathematical model of the speed loop of the permanent magnet synchronous motor as $$\dot{w} = \frac{K_{to}}{J_o}i_q - \frac{B_o}{J_o}w - d;$$

step 2: determining control objectives of a speed-governing system of the permanent magnet synchronous motor:

2-1) rapid and accurate tracking of a speed of the motor:

$$\lim_{t\to\infty} w = w^*;$$

where $w^*$ represents a given speed of the permanent magnet synchronous motor;

2-2) current saturation constraint: $|i_q(t)| < I_{max}$, $\forall t \geq 0$;

where $I_{max}$ represents the maximum allowable current of the permanent magnet synchronous motor during normal operation;

2-3) disturbance estimation: estimating system disturbances including parameters uncertainty and unknown load torque disturbance on line by means of a disturbance observer;

step 3: designing a super-twisting disturbance observer to accurately estimate lumped disturbances of the permanent magnet synchronous motor:

defining a speed estimation error signal: $\varepsilon = \hat{w} - w$;

where $\hat{w}$ represents an estimated speed of the permanent magnet synchronous motor;

then giving an integral sliding surface as shown below:

$$s = \left(\frac{d}{dt} + \lambda\right)\int_0^t \varepsilon\, dt;$$

where $\lambda$ represents a positive constant greater than 0;

the form of the designed super-twisting disturbance observer is as follows:

$$\dot{\hat{w}} = \frac{K_{to}}{J_o}i_q - \frac{B_o}{J_o}\hat{w} - f;$$

where $f(t)$ represents a control law of the super-twisting disturbance observer, and is equivalent to an estimated value of the lumped disturbances $d(t)$ when the disturbance observer tends to be stable, a specific structure of $f(t)$ is as follows:

$$f = \left(\lambda - \frac{B_o}{J_o}\right)\varepsilon + k_1|s|^{\frac{1}{2}}\operatorname{sign}(s) + k_2\int_0^t \operatorname{sign}(s)\, dt;$$

where sign(•) represents a signum function, and $k_1$ and $k_2$ represent positive constants satisfying the following condition:

$$\begin{cases} 32l_2 < k_1^2 < 8(k_2 - l_2); \\ k_2 > 5l_2 \end{cases}$$

step 4: constructing a permanent magnet synchronous motor speed controller based on a system model considering system parameters uncertainty and unknown load torque influence:

defining a motor speed tracking error: $e = w^* - w$;

in order to achieve a control objective of current constraint, introducing a saturation function:

$$\Psi(\bullet) = \frac{\bullet}{\sqrt{n + \bullet^2}};$$

where n represents a constant greater than or equal to 0; it is easy to know that $|\Psi(\bullet)| \leq 1$;

on the premise of avoiding introducing unavailable state variables such as motor acceleration signal and the like, constructing the following quasi-integral signal: $E = \Lambda + k_i\int_0^t e\, dt$, $\dot{\Lambda} = -k_i(\Lambda + k_i\int_0^t e\, dt)$;

where $\Lambda$ represents an auxiliary signal, $k_i$ represents a positive constant and is also control gain of a permanent magnet synchronous motor speed controller subsequently given, so it is easy to know that a dynamic equation of the quasi-integral signal is: $\dot{E} = -k_i E + k_i e$;

in combination with the designed super-twisting disturbance observer, designing a permanent magnet synchronous motor speed controller of the following form:

$$i_q = \frac{J_o}{K_{to}}\left[f + \frac{B_o}{J_o}w^* + k_p\psi(e) + k_i\psi(E) + k_l\operatorname{sign}(e)\right];$$

where $k_p$, $k_i$, $k_l$ represent positive adjustable control gains;

step 5: determining control gains of the permanent magnet synchronous motor speed controller:

according to the form of the controller, it is known that the values of the control gains $k_p$, $k_i$, $k_l$ determine control input, i.e. the magnitude of the current of the motor, in order to ensure the objective of the current saturation constraint in 2-2), the control gains shall be determined according to the following method:

$$\begin{cases} k_p + k_i + k_l \le \dfrac{K_{to}}{J_o}I_{max} - l_1 - \mu - \dfrac{B_o}{J_o}w^* \\ k_l > \mu \end{cases} ;$$

where all that on the right side of the first inequality are all available constants, $\mu$ represents an upper limit of an estimation error of the super-twisting disturbance observer and satisfies $|\tilde{d}|=|d(t)-f(t)| \le \mu$, $\forall t>0$, and $\tilde{d}$ in this equation represents an estimation error of the super-twisting disturbance observer;

step 6: achieving a control method:

controlling the operation of the permanent magnet synchronous motor by means of the designed controller so as to control the speed of the motor, constrain the current of the motor, estimate and compensate system disturbances, to achieve the control objectives of the speed-governing system of the permanent magnet synchronous motor.

The present invention has the following beneficial effects:

1. In consideration of influence of multi-source disturbances including system parameters uncertainty and unknown load torque disturbance on a permanent magnet synchronous motor in practical application, the present invention proposes a dynamic feedback control method combined with a disturbance observer, which can accurately estimate internal and external disturbances existing in an actual permanent magnet synchronous motor system and compensate same in real time and then precisely control the speed of the motor better, and is more suitable to be applied to an actual system.

2. The technical solution for permanent magnet synchronous motor control proposed by present invention can ensure that a current of the motor is always within a given range to avoid the problem of control performance reduction caused by the fact that the control current gets into a saturation state, and ensure the safety of a system, to play a role of safety protection of the current of the motor. Meanwhile, the proposed technical solution only needs to use the speed of the motor as feedback and does not need other complex signals, that is to say, there is no need to configure a plurality of sensors in practical industrial application, so system building costs can be reduced on the one hand, and the stability of the system can be improved on the other hand. In conclusion, the technical solution proposed by the present invention has important practical application significance.

DETAILED DESCRIPTION

In order to more visually and clearly reflect the technical solution and the advantages of the present invention, the present invention will be further described below in detail in combination with the drawings and embodiments.

Embodiment 1

Figure 1:
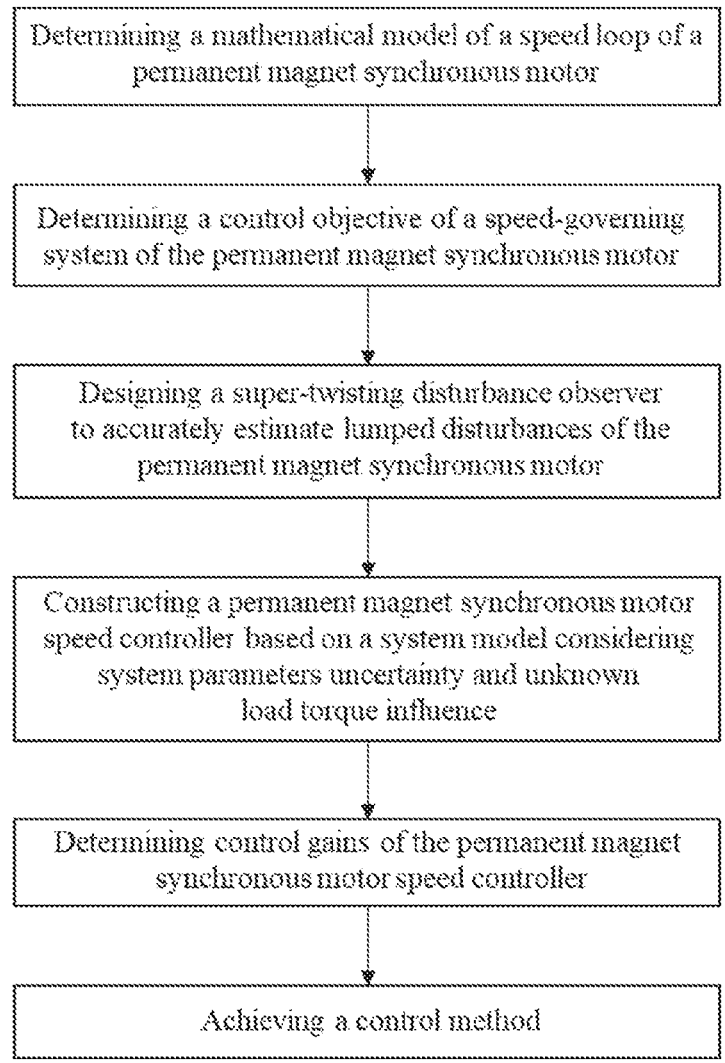
FIG. 1 is a flow chart of a speed control method for a permanent magnet synchronous motor of the present invention.

This embodiment discloses a speed control method for a permanent magnet synchronous motor considering current saturation and disturbance suppression, as shown in FIG. 1, comprising:

(I) Determining a mathematical model of a speed loop of a permanent magnet synchronous motor:

a mathematical model of a permanent magnet synchronous motor taking rotor coordinates (d-q axes) as reference coordinates system is shown as follows:

$$\begin{pmatrix} \dot{i}_d \\ \dot{i}_q \\ \dot{w} \end{pmatrix} = \begin{pmatrix} -\dfrac{R}{L} & n_p w & 0 \\ -n_p w & -\dfrac{R}{L} & \dfrac{n_p \psi_f}{L} \\ 0 & \dfrac{K_t}{J} & -\dfrac{B}{J} \end{pmatrix} \begin{pmatrix} i_d \\ i_q \\ w \end{pmatrix} + \begin{pmatrix} \dfrac{u_d}{L} \\ \dfrac{u_q}{L} \\ -\dfrac{T_L}{J} \end{pmatrix} \quad (1)$$

where $u_q$, $u_d$ represent stator voltages of q axis and d axis, $i_q$, $i_d$ represent stator currents of q axis and d axis, w represents a speed of the motor, $n_p$ represents the number of the pole pairs of the permanent magnet synchronous motor, L and R represent stator inductance and stator resistance respectively, $\psi_f$ represents a permanent magnet flux linkage, $K_t$ represents a torque constant, and $T_L$, B, J represent a load torque, a viscous friction coefficient and a moment of inertia respectively.

Figure 2:
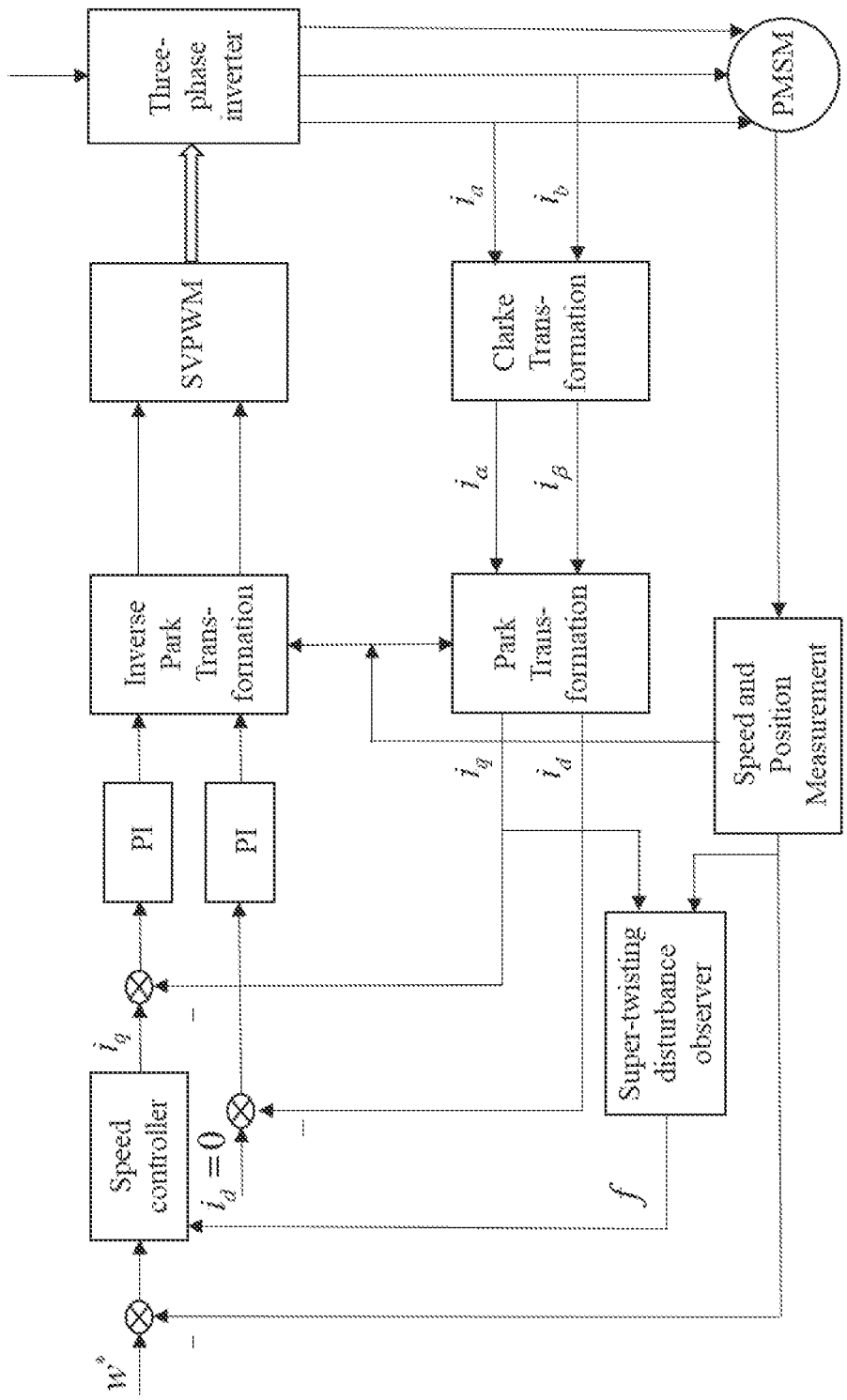
FIG. 2 is a block diagram of speed and current double closed loop vector control of a permanent magnet synchronous motor of the present invention.

The vector control framework is one of the most widely used control frameworks in the field of permanent magnet synchronous motor control at present. FIG. 2 shows a control block diagram of a speed-governing system of a permanent magnet synchronous motor based on vector control, which adopts a cascade structure of a speed loop and two current loops. In order to decouple speed control from current control, the reference current of d axis is set to 0. In these two current loops, two classical PI controllers are used to stabilize current errors of d-q axes. The present invention mainly provides a design scheme of a permanent magnet synchronous motor speed controller.

The following mathematical model of the speed loop of the permanent magnet synchronous motor is built on the premise that system parameters uncertainty and the unknown load torque disturbance are fully considered:

$$\dot{w} = \left(\dfrac{K_{to}}{J_o} + \Delta a\right) i_q - \left(\dfrac{B_o}{J_o} + \Delta b\right) w - \dfrac{T_L}{J} \quad (2)$$

where w represents a speed of the motor, $i_q$ represents a stator current of q axis, i.e. a permanent magnet synchronous motor speed controller to be designed, $J_o$, $K_{to}$, and $B_o$ respectively represent nominal values of a moment of inertia, a torque constant, and a viscous friction coefficient, and $\Delta a = K_t/J - K_{to}/J_o$ and $\Delta b = B/J - B_o/J_o$ represent differences between the true values of the system parameters and the nominal values.

Disturbances caused by system parameters uncertainty and unknown load torque disturbance are intensively expressed as a lumped disturbances term:

$$d(t) = -\Delta a i_q + \Delta b w + \dfrac{T_L}{J} \quad (3)$$

which meets the following bounded conditions:

$$|d(t)|<l_1, |\dot{d}(t)|<l_2 \quad (4)$$

where $l_1$ and $l_2$ represent positive constants.
The system model can be further expressed as $$\dot{w} = \frac{K_{to}}{J_o}i_q - \frac{B_o}{J_o}w - d \quad (5)$$

(II) Determining control objectives of a speed-governing system of the permanent magnet synchronous motor:
in the process of operation, the control objectives of the speed-governing system of the permanent magnet synchronous motor includes the following three parts: 1) adjust the speed of the motor to reach a given speed w* quickly and accurately; 2) effectively ensure that the current $i_q(t)$ of the motor is within a given safety range in the whole control process; 3) estimate lumped disturbances d(t) of the system on line by means of a disturbance observer.
To sum up, the control objectives of the present invention can be described as the following mathematical form:

$$\lim_{t \to \infty} w = w^* \quad (6)$$

$$|i_q(t)| < I_{max}, \forall t \geq 0 \quad (7)$$

$$\lim_{t \to \infty} \tilde{d}(t) = d(t) - f(t) = 0 \quad (8)$$

where $l_{max}$ represents the maximum allowable current of the permanent magnet synchronous motor during normal operation, $f(t)$ represents an estimated value of the lumped disturbances $d(t)$, and $\tilde{d}(t)$ represents an estimation error of the disturbance observer.

(III) Designing a super-twisting disturbance observer to accurately estimate lumped disturbances of permanent magnet synchronous motor:
based on the mathematical model of the speed loop of the permanent magnet synchronous motor in (5), designing a super-twisting disturbance observer of the following form:

$$\dot{\hat{w}} = \frac{K_{to}}{J_o}i_q - \frac{B_o}{J_o}\hat{w} - f \quad (9)$$

where $\hat{w}$ represents a motor speed estimation signal, and $f(t)$ represents a super-twisting controller to be designed;
defining a speed estimation error signal:

$$\varepsilon = \hat{w} - w \quad (10)$$

then giving an integral sliding surface as shown below:

$$s = \left(\frac{d}{dt} + \lambda\right)\int_0^t \varepsilon \, dt \quad (11)$$

where $\lambda$ represents a positive constant greater than 0;
taking the derivative a sliding surface s with respect to time t, and combining with equations (5), (9) and (10), so it is easy to obtain that:

$$\dot{s} = \dot{\varepsilon} + \lambda\varepsilon = \left(\lambda - \frac{B_o}{J_o}\right)\varepsilon - f + d \quad (12)$$

designing a super-twisting controller $f(t)$ as follows:

$$f = \left(\lambda - \frac{B_o}{J_o}\right)\varepsilon + k_1|s|^{\frac{1}{2}}\text{sign}(s) + k_2\int_0^t \text{sign}(s)dt \quad (13)$$

where $k_1$ and $k_2$ represent positive constant satisfying the following condition:

$$\begin{cases} 32l_2 < k_1^2 < 8(k_2 - l_2) \\ k_2 > 5l_2 \end{cases} \quad (14)$$

substituting equation (13) into equation (12), obtaining:

$$\dot{s} = -k_1|s|^{\frac{1}{2}}\text{sign}(s) - k_2\int_0^t \text{sign}(s)dt + d \quad (15)$$

here, introducing a new variable:

$$\eta = d - k_2\int_0^t \text{sign}(s) \quad (16)$$

conducting state transformation on equation (15), obtaining:

$$\begin{cases} \dot{s} = \eta - k_1|s|^{\frac{1}{2}}\text{sign}(s) \\ \dot{\eta} = \dot{d} - k_2\text{sign}(s) \end{cases} \quad (17)$$

then, by combining with the control gains condition given in equation (14) and using theorem 1 and lemma 5 in the reference [A. Polyakov and A. Poznyak, Reaching time estimation for "super-twisting" second order sliding mode controller via Lyapunov function designing, IEEE Transactions on Automatic Control, 2009, 54(8):1951-1955.], it can be deduced that within finite time:

$$s \to 0, \dot{s} \to 0 \quad (18)$$

if s=0, $\dot{s}$=0, by combining with equations (11) and (12), it can be known that:

$$\varepsilon \to 0 \, f \to d \quad (19)$$

here, if defining the disturbance estimation error $\tilde{d}$=d(t)−$f$(t), it can be known that:

$$\lim_{t \to \infty} \tilde{d}(t) = d(t) - f(t) = 0 \quad (20)$$

The above theoretical analysis indicates that the super-twisting disturbance observer designed by the present invention can accurately estimate lumped disturbances of the system. In order to ensure the rigor of the proposed technical solution, the present invention will consider the existence of a disturbance estimation error, which meets the following bounded condition:

$$|\tilde{d}| = |d(t) - f(t)| \leq \mu, \forall t > 0 \quad (21)$$

where μ represent an upper limit of the disturbance estimation error, which is a small positive constant.

(IV) Constructing a permanent magnet synchronous motor speed controller based on a system model considering system parameters uncertainty and unknown load torque influence:

defining a motor speed tracking error:

$$e = w^* - w \tag{22}$$

where w* represents a given speed of the motor;
in order to achieve a control objective of current constraint, introducing the following saturation function:

$$\Psi(\bullet) = \frac{\bullet}{\sqrt{n + \bullet^2}} \tag{23}$$

where n is a constant greater than or equal to 0; it is easy to know from the form of the saturation function that:

$$|\Psi(\bullet)| \leq 1 \tag{24}$$

further, on the premise of avoiding introducing unavailable state variables such as motor acceleration signal and the like, constructing the quasi-integral signal of the following type:

$$E = \Lambda + k_i \int_0^t e\, dt, \dot{\Lambda} = -k_i(\Lambda + k_i \int_0^t e\, dt) \tag{25}$$

where $\Lambda$ represents an auxiliary signal, $k_i$ represents a positive constant and is also a control gain of a permanent magnet synchronous motor speed controller subsequently given, so it is easy to know according to equation (25) that a dynamic equation of the quasi-integral signal is:

$$\dot{E} = -k_i E + k_i e \tag{26}$$

in combination with the designed super-twisting disturbance observer, designing a permanent magnet synchronous motor speed controller:

$$i_q = \frac{J_o}{K_{t0}}\left[f + \frac{B_o}{J_o}w^* + k_p\psi(e) + k_i\psi(E) + k_l\text{sign}(e)\right] \tag{27}$$

where $k_p$, $k_i$, $k_l$ represent positive adjustable control gains, and $k_l$ satisfies $$k_l > \mu \tag{28}$$

closed loop system stability analysis:
constructing a Lyapunov function candidate of the following form:

$$V = \frac{1}{2}e^2 + \int_0^E \psi(z)\,dz \tag{29}$$

taking the derivative of the above equation with respect to time and combining with equations (5), (21), (22) and (26), so the following conclusion can be drawn:

$$\begin{aligned}
\dot{V} &= e\dot{e} + \dot{E}\psi(E) \tag{30}\\
&= e\left(\dot{w}^* - \frac{K_{to}}{J_o}i_q + \frac{B_o}{J_o}w + d(t)\right) + k_ie\psi(E) - k_iE\psi(E)\\
&= e\left(-\frac{K_{to}}{J_o}i_q + \frac{B_o}{J_o}w + d(t) + k_i\psi(E)\right) - k_iE\psi(E)\\
&= e\left(-\frac{B_o}{J_o}e - k_p\psi(e) + d(t) - f - k_l\text{sign}(e)\right) - k_iE\psi(E)\\
&= -\frac{B_o}{J_o}e^2 - k_pe\psi(e) - k_iE\psi(E) + e(d(t) - f - k_l\text{sign}(e))\\
&= -\frac{B_o}{J_o}e^2 - k_pe\psi(e) - k_iE\psi(E) + e(\tilde{d} - k_l\text{sign}(e)) \leq\\
&\quad -\frac{B_o}{J_o}e^2 - k_pe\psi(e) - k_iE\psi(E) + e\mu - k_l|e| \leq\\
&\quad -\frac{B_o}{J_o}e^2 - k_pe\psi(e) - k_iE\psi(E) - (k_l - \mu)|e|
\end{aligned}$$

when the control gain $k_l$ is selected to satisfy equation (28), equation (30) can be further collated as $$\dot{V} \leq 0 \tag{31}$$

next, by combining with equation (29) and equation (31), it can be known that $$0 \leq V(t) < V(0) < < +\infty$$

the above result shows that v(t) is bounded, i.e. $v(t) \in \zeta_\infty$, further, according to the form of v(t), it can be obtained that $$e, E \in \zeta_\infty \Rightarrow i_q, \dot{e}, \dot{E} \in \zeta_\infty \tag{32}$$

according to the result of equation (30), it can be known that $$\dot{V} \leq -\frac{B_o}{J_o}e^2 \tag{33}$$

by integrating both sides of the above equation, it is easy to obtain that:

$$V(t) - V(0) \leq -\frac{B_o}{J_o}\int_0^t e^2\,dt \tag{34}$$

further, it is easy to obtain that $$0 \leq V(t) \leq V(0) - \frac{B_o}{J_o}\int_0^t e^2\,dt \Rightarrow \int_0^t e^2\,dt \leq \frac{J_o}{B_o}V(0) \tag{35}$$

the above result means that the error signal e is square-integrable, i.e.

$$e \in \zeta_2 \tag{36}$$

and because it has been proved that $$e, \dot{e} \in \zeta_\infty \tag{37}$$

according to Barbalat lemma, it can be known that the speed tracking error e asymptotically converges to 0, i.e.

$$\lim_{t \to \infty} e = 0 \tag{38}$$

The analysis proves that the present invention can control the high performance speed of the permanent magnet synchronous motor system, that is, control the speed of the motor to rapidly and accurately reach a given value.

(V). Determining control gains of the permanent magnet synchronous motor speed controller:

next, the present invention will give a control gains selection method of the designed controller to ensure that the current of the motor is always within a given safety range during motor operation, i.e. satisfies $$|i_q(t)| < I_{max}, \forall t \geq 0 \tag{7}$$

further, according to the expression (27) of the controller $i_q(t)$, the following relation is required to hold:

$$|i_q| = \left| \frac{J_o}{K_{to}} \left[ f + \frac{B_o}{J_o} w^* + k_p \psi(e) + k_i \psi(E) + k_l \text{sign}(e) \right] \right| \leq I_{max} \quad (39)$$

according to equations (4) and (21), it can be obtained that:

$$|f| \leq l_1 + \mu \quad (40)$$

meanwhile, the signum function satisfies $|\text{sign}(\cdot)| \leq 1$, and according to the property $|\Psi(\cdot)| \leq 1$ of the saturation function in equation (23), it can be known that if equation (39) holds, the control gains of the proposed controller shall be determined according to the following method:

$$k_p + k_i + k_l \leq \frac{K_{to}}{J_o} I_{max} - l_1 - \mu - \frac{B_o}{J_o} w^* \quad (41)$$

in addition, in combination with equation (28), it can be known that the complete control gains selection condition of the proposed permanent magnet synchronous motor speed controller is $$\begin{cases} k_p + k_i + k_l \leq \frac{K_{to}}{J_o} I_{max} - l_1 - \mu - \frac{B_o}{J_o} w^* \\ k_l > \mu \end{cases} \quad (42)$$

(VI) Achieving a control method:

the speed IN of the motor is measured by a speed sensor installed in the permanent magnet synchronous motor system, the control method (27) is used as a speed loop controller to control the motor, so the speed of the motor can be accurately tracked, and the current of the motor can be constrained within a given range, and the disturbance influence can be effectively suppressed to achieve the control objective of the speed-governing system of the permanent magnet synchronous motor.

Simulation Result Description:

In order to verify the performance of the speed control technology of the permanent magnet synchronous motor proposed by the present invention, the results of simulation comparison between the proposed control method and the traditional PI control method are given in this part. In simulation, the values of system parameters are selected as follows:

$$J_o = 0.089 \text{ kg} \cdot \text{m}^2, B_o = 0.005 \text{N} \cdot \text{m} \cdot \text{s/rad}, K_{to} = 6.219 \text{N} \cdot \text{m/A},$$

$$L = 7.8 \times 10^{-3} \text{ H}, R = 0.346 \Omega, \Psi_f = 0.51825 Wb, n_p = 2$$

It is noteworthy that $J_o$, $B_o$, $K_{to}$ in the above equation are nominal values of the system, in actual simulation, in order to simulate system parameters uncertainty, the actual system parameters are adjusted as:

$$J = 1.2 J_o, B = 2 B_o, K_t = K_{to}$$

Meanwhile, in order to test the control performance of the method proposed by the present invention in the face of unknown load torque disturbance, the suddenly added load torque $T_L = 5.5$ N·m at 0.8 s and the suddenly reduced load at 0 is are simulated. In addition, the maximum allowable current during motor operation is set to $I_{max} = 10$ A.

The double closed loop vector control framework of the permanent magnet synchronous motor shown in FIG. 2 is adopted in the simulation. The control gains settings of the proposed control method and the traditional PI control method are given below:

1) The traditional PI control method:
the control gains of the traditional PI controller adopted in the speed loop are set to:

$$k_{ps} = 11, k_{is} = 0.5.$$

2) The method proposed by the present invention:
the control gains of the speed controller in (27) designed by the present invention, the saturation function in (23) and the super-twisting disturbance observer in (13) adopted in the speed loop are set to:

$$k_p = 480, k_i = 27, k_l = 0.01, n = 75,$$

$$\lambda = 900, k_1 = 11, k_2 = 3.5$$

Figure 3:
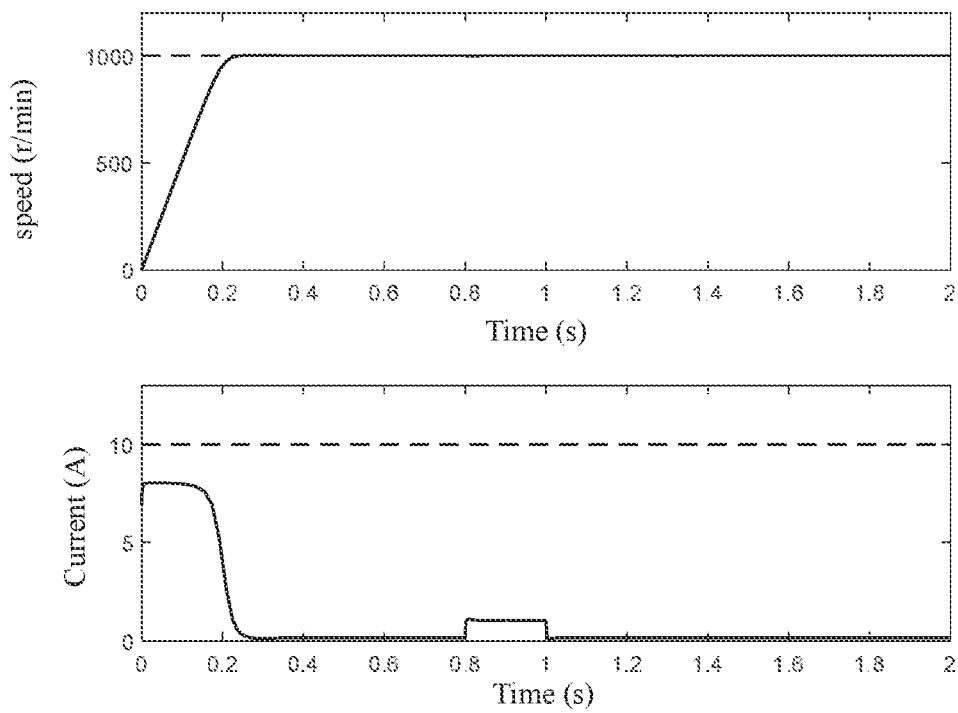
FIG. 3 is a diagram of simulation results of a speed control method for a permanent magnet synchronous motor proposed by the present invention.
Figure 4:
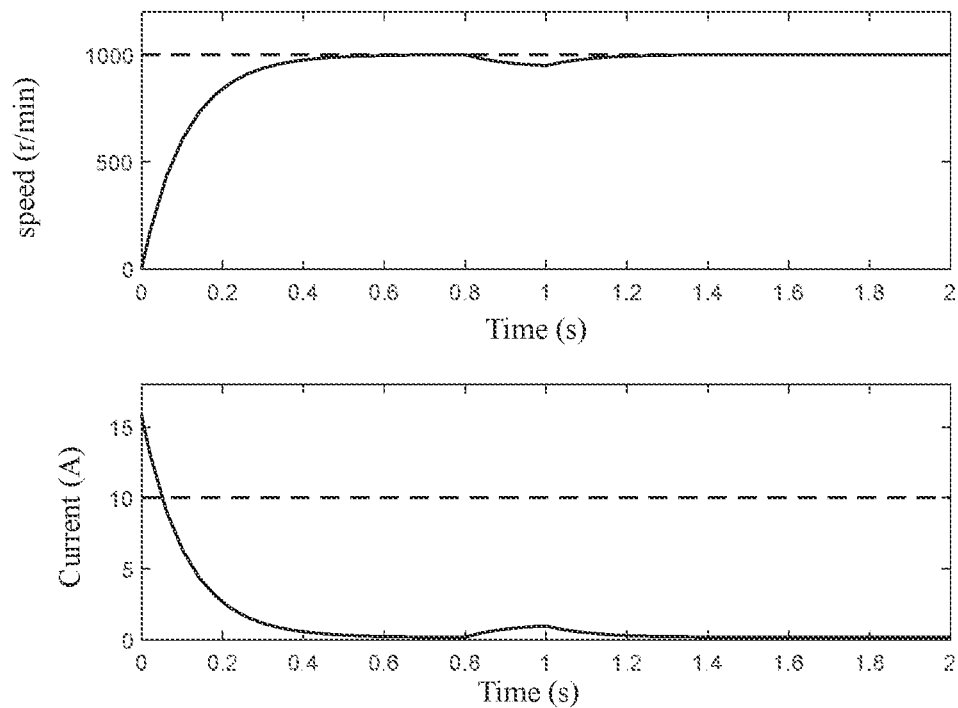
FIG. 4 is a diagram of simulation results of a PI control method in the prior art.

FIG. 3 and FIG. 4 respectively show the simulation results of the method proposed by the present invention and the traditional PI control method. The given speed of the system is set to w*=1000 r/min. By comparing FIG. 3 and FIG. 4, it can be known that the method proposed by the present invention has a faster response speed and higher tracking accuracy as compared with the traditional PI control method. When the load torque disturbance is suddenly added or suddenly reduced, by estimating and compensating the disturbance by means of the designed super-twisting disturbance observer, the method proposed by the present invention can make the system have strong anti-disturbance performance, thus the speed tracking performance of the motor is almost not affected by disturbance. While for the compared traditional PI control method, the speed of the motor fluctuates obviously when the load torque disturbance is suddenly added and suddenly reduced. In addition, it is more noteworthy that the method proposed by the present invention can ensure that the current of the motor is always within a given range during the whole motor operation process, while for the PI control method, the initial current reaches 16 A at the motor starting stage, which far exceeds the given upper limit of the current.

In summary, the method of the present invention can suppress disturbance influence, effectively realize the rapid tracking of the speed of the motor, meanwhile, compared with the prior art, this technology can ensure that the current of the motor is always within a given range, plays a role of prevention of current saturation and safety protection, and can be applied to an actual system.

The invention claimed is:

1. A speed control method for a permanent magnet synchronous motor considering current saturation and disturbance suppression, comprising steps of:

step 1: determining mathematical model of speed loop of permanent magnet synchronous motor:

by taking rotor coordinates d–q axes of the motor as reference coordinates system, on the premise of fully considering system parameters uncertainty and unknown load torque disturbance, building the mathematical model of speed loop of permanent magnet synchronous motor:

$$\dot{w} = \left( \frac{K_{to}}{J_o} + \Delta a \right) i_q - \left( \frac{B_o}{J_o} + \Delta b \right) w - \frac{T_L}{J};$$

where w represents speed of the motor, $i_q$ represents stator current of q axis, is permanent magnet synchronous motor speed controller to be designed, $T_L$ represents unknown load torque of the system, $J_o$, $K_{to}$, and $B_o$ respectively represent nominal values of moment of inertia, torque constant, and viscous friction coefficient, J, $K_t$, and B respectively represent true values of the moment of inertia, the torque constant, and the viscous friction coefficient, and $\Delta a=K_t/J-K_{to}/J_o$ and $\Delta b=B/J-B_o/J_o$ represent differences between true values of the system parameters and nominal values;

intensively expressing disturbances caused by system parameters uncertainty and unknown load torque disturbance as lumped disturbances:

$$d(t) = -\Delta a i_q + \Delta b w + \frac{T_L}{J},$$

which satisfies the following bounded conditions: $|d(t)|<l_1$, $|\dot{d}(t)|<l_2$, where $l_1$ and $l_2$ represent positive constants;

further expressing the mathematical model of the speed loop of the permanent magnet synchronous motor as $$\dot{w} = \frac{K_{to}}{J_o}i_q - \frac{B_o}{J_o}w - d;$$

step 2: determining control objectives of a speed-governing system of the permanent magnet synchronous motor:

2-1) rapid and accurate tracking of speed of the motor:

$$\lim_{t\to\infty} w = w^*;$$

where $w^*$ represents given speed of the permanent magnet synchronous motor;

2-2) current saturation constraint: $|i_q(t)|<I_{max}$, $\forall t \geq 0$;

where $I_{max}$ represents the maximum allowable current of the permanent magnet synchronous motor during normal operation;

2-3) disturbance estimation: estimating system disturbances including parameters uncertainty and unknown load torque disturbance on line by means of disturbance observer;

step 3: designing a super-twisting disturbance observer to accurately estimate lumped disturbances of the permanent magnet synchronous motor:

defining a speed estimation error signal: $\varepsilon=\hat{w}-w$;

where $\hat{w}$ represents an estimated speed of the permanent magnet synchronous motor;

then giving an integral sliding surface as shown below:

$$s = \left(\frac{d}{dt} + \lambda\right) \int_0^t \varepsilon dt;$$

where $\lambda$ represents a positive constant greater than 0;

a form of the super-twisting disturbance observer is as follows:

$$\dot{\hat{w}} = \frac{K_{to}}{J_o}i_q - \frac{B_o}{J_o}\hat{w} - f;$$

where $f(t)$ represents control law of the super-twisting disturbance observer, and is equivalent to estimated value of lumped disturbances $d(t)$ when the disturbance observer tends to be stable, specific structure of $f(t)$ is as follows:

$$f = \left(\lambda - \frac{B_o}{J_o}\right)\varepsilon + k_1|s|^{\frac{1}{2}}\text{sign}(s) + k_2\int_0^t \text{sign}(s)dt;$$

where $\text{sign}(\bullet)$ represents signum function, and $k_1$ and $k_2$ represent positive constants satisfying following condition:

$$\begin{cases} 32l_2 < k_1^2 < 8(k_2 - l_2) \\ k_2 > 5l_2 \end{cases};$$

step 4: constructing a permanent magnet synchronous motor speed controller based on system model considering system parameters uncertainty and unknown load torque influence;

defining motor speed tracking error: $e=w^*-w$;

in order to achieve control objective of current constraint, introducing a saturation function:

$$\Psi(\bullet) = \frac{\bullet}{\sqrt{n + \bullet^2}};$$

where n represents constant greater than or equal to 0; it is known that $|\Psi(\bullet)| \leq 1$;

on a premise of avoiding introducing unavailable state variables, constructing a quasi-integral signal: $E = \Lambda + k_i\int_0^t edt$, $\dot{\Lambda} = -k_i(\Lambda + k_i\int_0^t edt)$;

where $\Lambda$ represents auxiliary signal, $k_i$ represents positive constant and is also control gain of subsequently given permanent magnet synchronous motor speed controller, a dynamic equation of the quasi-integral signal is: $\dot{E} = -k_i E + k_i e$;

in combination with the super-twisting disturbance observer, designing a permanent magnet synchronous motor speed controller of a following form:

$$i_q = \frac{J_o}{K_{to}}\left[f + \frac{B_o}{J_o}w^* + k_p\Psi(e) + k_i\Psi(E) + k_l\text{sign}(e)\right];$$

where $k_p$, $k_i$, $k_l$ represent positive adjustable control gains;

step 5: determining control gains of the permanent magnet synchronous motor speed controller:

according to the controller, it is known that values of control gains $k_p$, $k_i$, $k_l$ determine control input, is the magnitude of the current of the motor, in order to ensure an objective of the current saturation constraint in 2-2), the control gains shall be determined according to a following method:

$$\begin{cases} k_p + k_i + k_l \leq \frac{K_{to}}{J_o}I_{max} - l_1 - \mu - \frac{B_o}{J_o}w^* \\ k_l > \mu \end{cases};$$

where all that on a right side of a first inequality are all available constants, $\mu$ represents an upper limit of an estimation error of the super-twisting disturbance observer and satisfies $|\tilde{d}| = |d(t) - f(t)| \leq \mu$, $\forall t > 0$, $\tilde{d}$ represents an estimation error of the super-twisting disturbance observer;

step 6: achieving a control method:

controlling an operation of the permanent magnet synchronous motor by means of the permanent magnet synchronous motor speed controller so as to control the speed of the motor, constrain the current of the motor, estimate and compensate system disturbances, to achieve control objectives of a speed-governing system of the permanent magnet synchronous motor.

\* \* \* \* \*